Patented Mar. 2, 1937

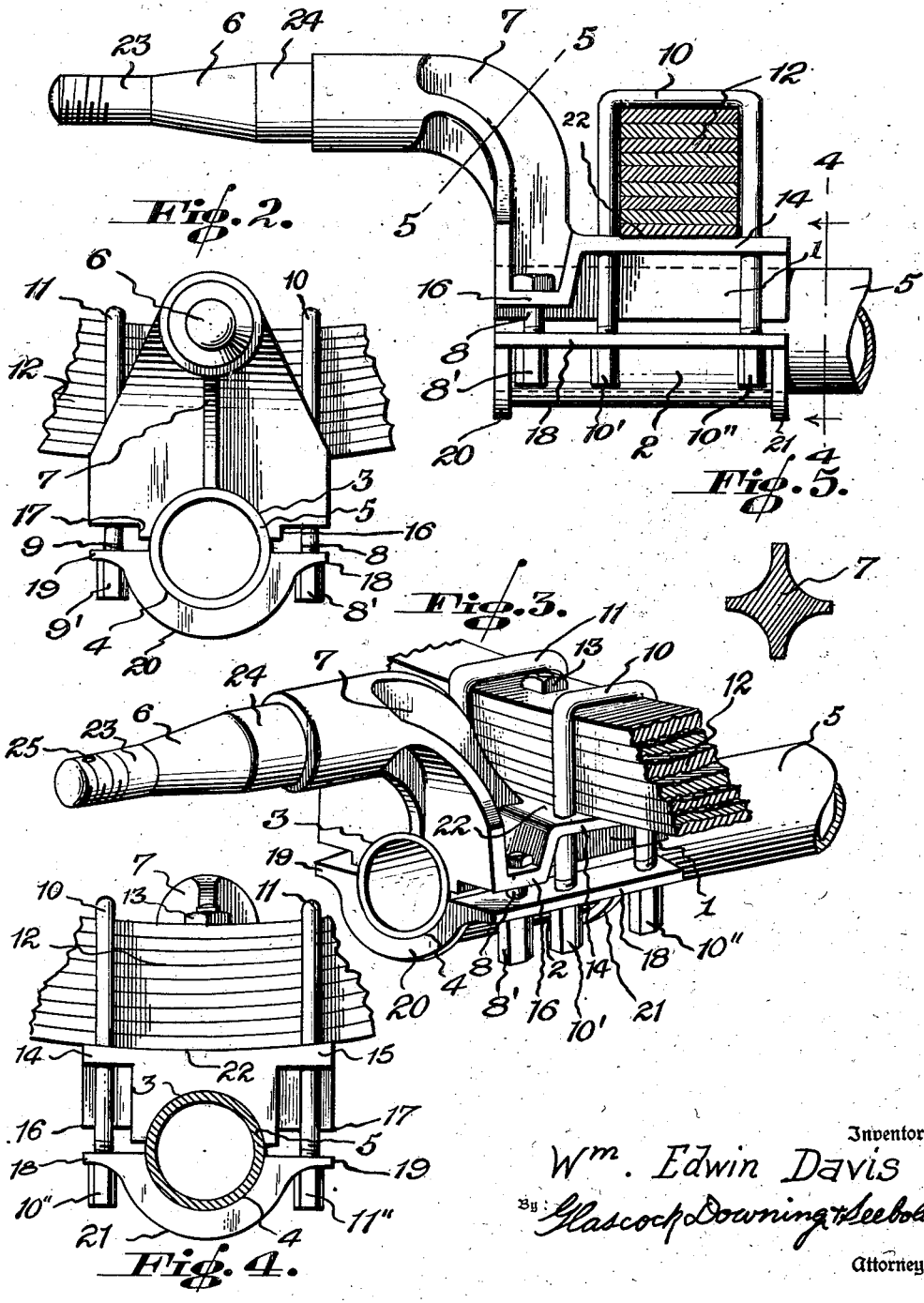

2,072,198

UNITED STATES PATENT OFFICE 2,072,198

SPRING AND SPINDLE BRACKET

William Edwin Davis, Macon, Ga.

Application May 26, 1936, Serial No. 81,927

5 Claims. (Cl. 301—124)

My invention relates to an improvement in spring and spindle brackets for use on trailers or a similar type of vehicle.

The object of my invention is to provide a spring and spindle bracket of simple construction whereby all reaming operations are dispensed with and the only machining necessary is the turning of the spindle, which is integral with the bracket, on a lathe.

Further objects of my invention are to position the springs near the spindle so as to improve the riding qualities of the vehicle and to lower the center of gravity and to prevent sidesway.

The simplified construction according to the present invention, enables one, who is not an expert mechanic, to quickly and accurately assemble the bracket and associated parts. The bracket is preferably made of steel but other suitable metal castings may also be used. The bracket may be of any size and carrying capacity depending on the type of vehicle to be fitted.

The accompanying drawing shows by way of example, only, a form of my invention, wherein:

Fig. 1 is a side elevation of the bracket with a spring secured thereto,

Fig. 2 is a front elevation of the bracket,

Fig. 3 is a perspective view of the bracket,

Fig. 4 is a section taken on line 4—4 of Fig. 1, and

Fig. 5 is a cross-section taken on line 5—5 of Fig. 1.

In all the figures like reference numerals refer to like parts.

With reference to the drawing, the bracket is composed of two parts 1 and 2, each being provided with a channel or groove 3 and 4 respectively for receiving an axle 5, which may be of soft iron pipe or the like. It is contemplated, of course, that these channels may be rectangular or any other desired shape instead of curved as shown in the drawing, so that any desired shape of axle may be used; the only requirement being that the shape of the channels be substantially complementary to the shape of the axle.

The upper bracket member 1 is provided at its outer end with a spindle 6 and a connecting neck 7, the spindle and connecting neck being integral with the member 1 and cast in one piece therewith.

The two bracket members 1 and 2 are secured to the axle 5 by means of bolts 8, 9, 10 and 11, the bolts 10 and 11 being U-bolts and serving not only to secure the bracket members to the axle 5 but also to secure the spring 12 to the upper bracket member. 13 is a tie bolt for securing the leaves of the spring 12 together.

The upper bracket member 1 is provided with flanges 14 and 15 having holes for receiving the U-bolts 10 and 11. As an extension of the flanges 14 and 15 there are the depressed flanges 16 and 17 having holes for the bolts 8 and 9. The lower bracket member 2 is provided with flanges 18 and 19 having holes for receiving the bolts 8, 9, 10 and 11. The nuts 8', 9', 10', 10", 11' and 11" secure the bolts in position. The ribs 20 and 21 strengthen the lower bracket member 2.

The top surface 22 of member 1 is slightly arcuate and constitutes a seat for the spring and has a depression therein, not shown, for receiving the lower end of the tie-bolt 13. The top surfaces of the flanges 14 and 15 may be flush with the surface 22 and thereby enlarge the total surface on which the spring 12 rests.

The spindle is provided with bearing surfaces 23 and 24, which are turned on a lathe and a hole 25 at the outer end thereof for receiving a cotter pin or like securing element for a wheel.

The connecting neck 7 extends upwardly and outwardly from the bracket member 1 and has a cross-shaped cross section as shown in Fig. 5 for reducing the weight of the bracket without diminishing the rigidity thereof.

Having now particularly described my invention what I claim is:

1. A spring and spindle bracket for use with a vehicle having an axle and a spring, comprising a bracket composed of two members, a spindle integral with one of the members, means for securing the spring to one of said members and for securing the two bracket members together with the end portion of the axle clamped therebetween.

2. A spring and spindle bracket as claimed in claim 1, wherein the securing means are constituted by U-shaped bolts which pass through said bracket members.

3. A spring and spindle bracket as claimed in claim 1 wherein the securing means are constituted by U-shaped bolts which pass through said bracket members, the bases of said U-shaped bolts engaging and retaining the spring on one of said members.

4. A spring and spindle bracket for use with a vehicle having an axle and a spring comprising a bracket composed of an upper and lower member, each member being provided with a channel for receiving the axle, the shape of the channels being substantially complementary to the shape of the axle, means for securing the bracket members to each other and to the axle, a spindle, and a neck portion connecting said spindle to said upper member, the spindle and neck portion being integral with said upper member, the top surface of said member constituting a seat for the spring and means for securing the spring to the bracket and for additionally securing the two portions of the bracket in clamping relation to the axle.

5. A spring and spindle bracket for use with a vehicle having an axle and a spring comprising a bracket composed of an upper and lower member, each member being provided with a channel for receiving the axle, a spindle, a neck portion connecting the spindle to the outer end of said upper member, said neck portion extending upwardly and outwardly from the bracket member, a seat portion on the upper part of the upper member for receiving the spring, means securing the spring to the seat portion and securing the bracket members together, depressed portions intermediate the neck and seat portion, and adjacent the lower bracket member and a bolt additionally securing the two bracket members together, the head of the bolt being disposed in said depressed portion.

WILLIAM EDWIN DAVIS.